Sept. 5, 1950 S. S. FOX 2,521,002
WATER INJECTION DERICHMENT DEVICE
Filed April 13, 1944
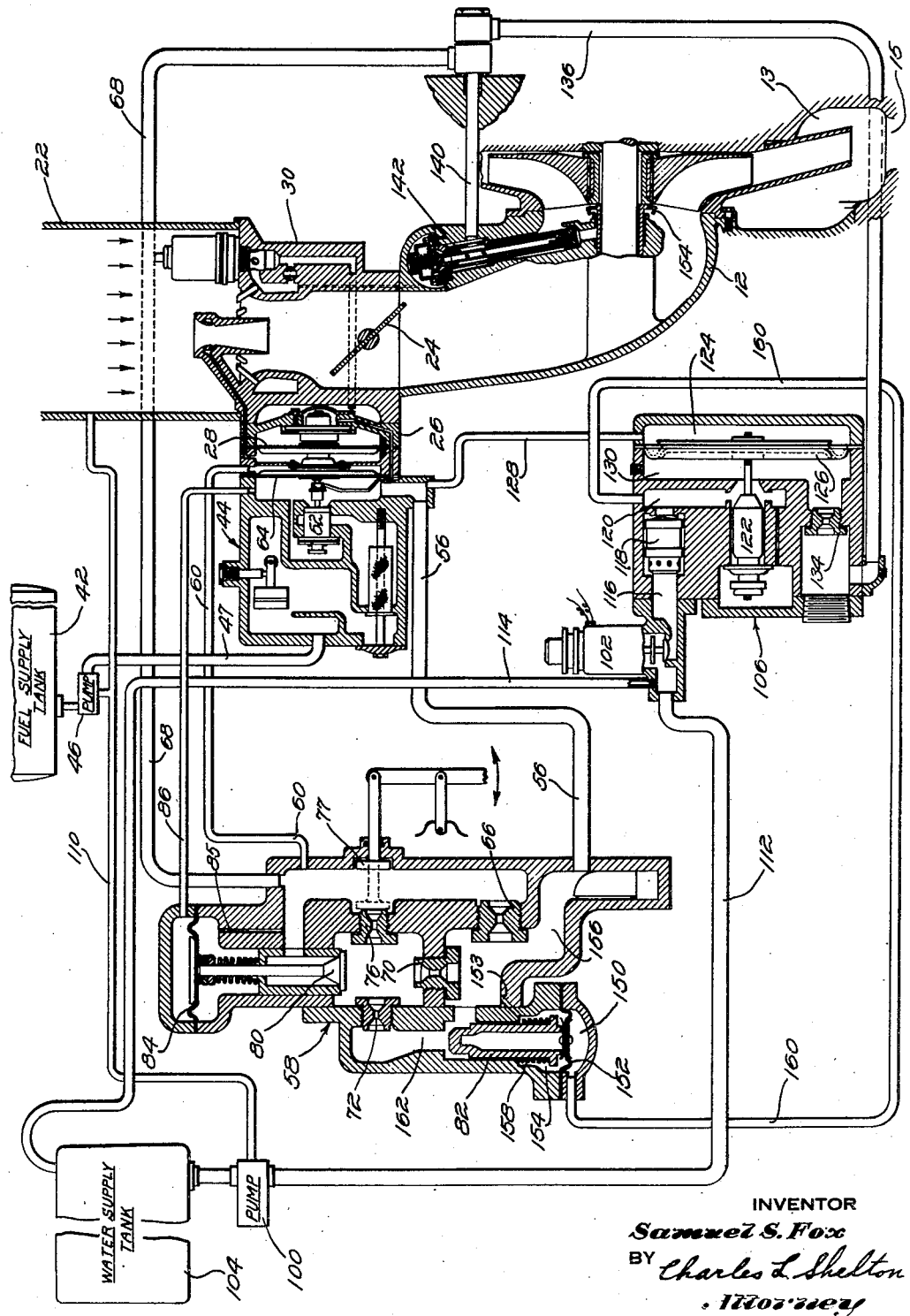
INVENTOR
*Samuel S. Fox*
BY *Charles L. Shelton*
*Attorney*

Patented Sept. 5, 1950

2,521,002

UNITED STATES PATENT OFFICE 2,521,002

WATER INJECTION DERICHMENT DEVICE

Samuel S. Fox, West Hartford, Conn., assignor to United Aircraft Corporation, East Hartford, Conn., a corporation of Delaware Application April 13, 1944, Serial No. 530,935

10 Claims. (Cl. 261—18)

This invention relates to improvements in apparatus for operating an internal combustion engine with a charge including a combustion modifying ingredient, such as water or a mixture of water and alcohol.

An object of this invention is to provide an improvement or modification in a charge mixture strength controlling means, which is particularly adapted for use with the ingredient injection apparatus disclosed and claimed in the application of Robert C. Palmer, Jr., Serial No. 529,104, filed April 1, 1944, and assigned to applicant's assignee.

Other objects and advantages will be apparent from the specification and claims, and from the accompanying drawing which illustrates what is now considered to be a preferred embodiment of the invention.

The single figure of drawing shows a diagrammatic view, partly in section, of a water injection apparatus, including the mixture control means of this invention.

According to this invention, a pressure type carburetor is provided with two separate jets, in place of the conventional economized jet, arranged in parallel. One of these jets, which may be called a "derichment jet," is controlled by a valve subjected to the inlet water pressure of a water injection regulator, and is arranged to be automatically closed when water is being fed to the engine charge.

Referring to the drawing, supercharger 12 pumps air from manifold 22 to an annular collector chamber 13, from which the charging fluid may be fed to an engine, such as a radial aircooled aircraft engine, by way of outlets 15 in a known manner. Manifold 22 may be open to the atmosphere, or it may be connected with the outlet of an auxiliary supercharger stage as disclosed in the Palmer application, identified above, and to which reference is made for a detailed description of a charging apparatus with which this invention is particularly adapted for use.

The mass or weight rate of airflow to the engine may be controlled by a manually operated throttle 24, to vary the power output of the engine. This varying airflow is continuously measured by the carburetor Venturi section 30, which maintains an air pressure differential across the diaphragm 28 of the carburetor air metering section 26 which is a function of the rate of flow by weight of intake air. Air diaphragm 28 acts in conjunction with fuel diaphragm 64, which is subjected to the fuel metering pressure differential, to actuate the fuel valve 52 so as to control the rate of flow of fuel through line 47 from the fuel tank 42 to the fuel feed line 68 leading to the engine in proportion to the rate of flow by weight of intake air. Unmetered fuel, at a pressure regulated by the valve 52, passes to the fuel control body 58 through a conduit 56 and after being metered by the various jets 66, 70, 72, 76 and economizer valve 80 of the fuel control body, is passed to the discharge nozzle 142 through feed line 68 and injected into the spinner cup 154, from which it is centrifugally thrown into the airstream passing through the supercharger, as disclosed and claimed in the patent to Buck, No. 2,287,021, granted June 23, 1942, and assigned to applicant's assignee. A metered fuel pressure transfer line 60 connects fuel pressure regulator 44 with the metered fuel in fuel control body 58.

Water from tank 104 may also be supplied to the engine charge, being forced by pump 100 through line 112, regulator 106, and feed line 136 to the common feed line 140 in which it is mixed with fuel flowing to the engine through the fuel feed line 68. For proportioning the flow of water to the flow of intake air, valve 122 in water regulator 106 is actuated by diaphragm 126 subjected on one side to unmetered fuel pressure admitted to chamber 124 through line 128 and on the other side to the pressure of the water admitted to chamber 130 by valve 122. This diaphragm controls valve 122 so as to maintain the water pressure in chamber 130 (which is the unmetered water pressure ahead of water jet 134) equal to the unmetered fuel pressure in chamber 124. The water pressure on the downstream side of the water metering jet 134 will be equal to the metered fuel pressure on the downstream side of the fuel metering jets in the fuel control body 58, because the fuel feed line 68 and the water feed line 136 are interconnected and discharge into a common line 140. As diaphragm 126 actuates valve 122 so as to maintain the unmetered water pressure equal to the unmetered fuel pressure, it will be seen that the regulator 106 maintains the water pressure drop across the water jet 134 equal to the fuel pressure drop across the fuel metering jets. The fuel metering pressure differential is controlled as a function of the rate of flow of intake air by air section 26 and fuel section 44, hence the water metering pressure differential will also be a function of the rate of flow of intake air and consequently the quantity of water supplied to the engine will be proportioned to the quantity of air supplied to the engine.

Solenoid valve 102 is provided for admitting water to the engine at the will of the operator. When this valve is opened, water under pressure will enter chamber 116 of the water regulator, open check valve 118, and flow to inlet water chamber 120, from which it will be admitted to the engine in predetermined proportion to the flow of intake air by valve 122 and water jet 134. Supply line 112 is vented to tank 104 by a vent 114.

Regulator 106 is connected to fuel control body 58 by a water pressure transfer line 160 which connects inlet chamber 120 of the regulator with chamber 150 on one side of diaphragm 152 actuating derichment valve 82, which controls the flow through fuel passage 162 leading to derichment jet 72. Chamber 154 on the other side of diaphragm 152 is subjected to unmetered fuel pressure by passage 153, connected with the inlet chamber 156 of the fuel control body. A spring 158 biases valve 82 in an opening direction.

When valve 102 is closed and water is not being added to the engine charge, the pressure in chambers 130 and 120 of regulator 106 will be equal to the pressure in water feed line 136 and hence will be equal to the metered fuel pressure in fuel feed line 68. No water will be flowing to the engine, because valve 102 is closed, and hence there will be no pressure drop across water jet 134. Under these conditions the pressure in chamber 150 of the derichment valve on the fuel control body will also be equal to metered fuel pressure, which is less than the unmetered fuel pressure in chamber 154. The fluid pressure forces acting on diaphragm 152 will tend to move this diaphragm downwardly, in a valve opening direction. This action is aided by compression sping 158. Thus, when water is not being injected, economizer jet 70 and derichment jet 72 will both be open and will act together to limit the maximum amount of supplementary fuel added to the intake air by the action of the auto-rich jet 76 (which is controlled by a manual valve 77) and the economizer valve 80 (which is automatically controlled by diaphragm 84), just as does the single economizer jet of a conventional fuel control body. Economizer valve diaphragm 84 is subjected to the fuel metering pressure differential by passage 85 and transfer line 86.

When valve 102 is opened and water starts to flow to the engine, the pressure in inlet chamber 120 will immediately build up to a value which is approximately the same as the operating pressure created by pump 100 in line 112, and which is greater than the pressure that will be maintained in the unmetered water chamber 130 by valve 122. Pumps 100 and 46 are of a known type, providing a substantially constant discharge pressure above the reference pressure in balancing line 110, connected to manifold 22. The pressure in derichment chamber 150 is held equal to the pressure in chamber 120 by line 160 and this pressure is sufficiently great, when water is flowing to the engine, to overcome the force exerted downwardly on diaphragm 152 by the unmetered fuel pressure in chamber 154 and the spring 158, and valve 82 will be closed to shut off the flow of fuel through derichment jet 72. Just as soon as the flow of water is started to the engine, the flow of supplementary fuel, which was previously limited by both jets 70 and 72, will be limited to a lower maximum as determined by the flow capacity of jet 70 only, because jet 72 will be cut out by the closing of valve 82. When water is flowing through the regulator 106, valve 82 will be held closed and the maximum mixture strength of the engine charge will be automatically decreased to a value providing the desired engine operating characteristics for a charge including the combustion modifying ingredient. In other words, fuel control body 58 and the water regulator 106 cooperate to provide a predetermined lower maximum mixture strength or maximum fuel air-ratio when water is being supplied to the engine charge. The engine may be supplied with different charges at different times, with the ingredients of each charge being always proportioned in predetermined ratio to each other, said predetermined ratio being automatically altered or adjusted to provide the most desirable charge proportions according to the nature of the ingredients composing the charge.

Valve 82 will be held open by the pressure of the fuel in chamber 154 and the force of spring 158 except when operating water pressure is maintained in chamber 120 of the water regulator. A failure or an undue drop in the operating pressure in chamber 120 for any reason, for instance as might be caused by exhaustion of the water in tank 104, will enable valve 82 to open and prevent damage that might otherwise result from operating the engine at the lower mixture strengths, without water. The structure is simple, reliable, and efficient and acts immediately and positively to reset the mixture control to a "best power" or other desired fuel-air ratio when the flow of charging water, or other ingredient, is started; the change in fuel-air ratio being determined by the characteristics of derichment jet 72, independently of the quantity of water flow.

It is to be understood that the invention is not limited to the specific embodiment herein illustrated and described, but may be used in other ways without departure from its spirit as defined by the following claims.

I claim:

1. In a water injection apparatus for an internal combustion engine, means for charging an engine with a mixture of fuel and air, a device for varying the fuel-air ratio of the engine charge, a pump for supplying water under pressure to the engine charge, a valve for regulating the flow of said water in accordance with the flow of charging air, and means subjected to the pressure of the water between said pump and said valve for adjusting said device to vary said fuel-air ratio.

2. In a water injection apparatus, a water regulator including a water valve and an inlet water passage for said valve, a fuel control body including a fuel metering jet, and means responsive to an increase in the pressure of the water in said inlet passage for stopping the flow of fuel through said jet.

3. In an internal combustion engine, means for feeding charging air to said engine, means for feeding fuel to said engine in predetermined ratio to the quantity of charging air, means for feeding a combustion modifying liquid ingredient to said engine in predetermined ratio to the quantity of charging air, and means unaffected by normal variations in the rate of flow of said ingredient through an operating range of ingredient flows for changing said fuel-air ratio upon a substantial cessation of the flow of said ingredient, below said range of operating flow rates.

4. In a liquid ingredient injection apparatus for an internal combustion engine having an air intake, a fuel supply line, means including a fuel flow regulating valve in said fuel line for regulating the flow of fuel to said engine in accordance with the flow of engine intake air, an ingredient supply line, means including an ingredient flow regulating valve in said ingredient line for regulating the flow of ingredient to said engine in accordance with the flow of engine intake air, an ingredient control valve in said ingredient line upstream of said ingredient flow regulating valve, a fuel control valve in said fuel line downstream of said fuel flow regulating valve, means for actuating said ingredient control valve, and means responsive to fuel pressure downstream of said fuel flow regulating valve and to ingredient pressure upstream of said ingredient flow regulating valve for actuating the said fuel control valve in accordance with the actuation of said ingredient control valve.

5. In an aircraft engine having an air intake, mechanism responsive to intake air flow for regulating the flow of fuel to said engine, mechanism operatively associated with said fuel flow regulating mechanism for regulating the flow of water to said engine, and a fuel pressure and water pressure responsive device operatively associated with said fuel flow regulating mechanism and with said water flow regulating mechanism for instantaneously shifting the fuel-air ratio of said engine a predetermined amount when the flow of water to said engine through said water flow regulating mechanism ceases.

6. In a water injection apparatus for an engine, a fuel control means including a fuel metering jet and a valve for controlling the flow of fuel through said jet, and means responsive to fuel pressure and to water pressure for actuating said valve.

7. In a water injection apparatus for an engine having a main fuel metering jet and an auxiliary metering jet of fixed flow capacity, a valve separate from said auxiliary jet for starting and stopping the flow of fuel through said auxiliary jet to the engine, and means for operating said valve in response to initiation of water flow to the engine.

8. A fuel control body comprising, a main fuel metering jet, a fuel economizer jet, an additional fuel jet, an economizer valve in series with each of said second and third named jets for regulating the flow of fuel according to intake airflow, a valve for controlling the flow of fuel through said additional fuel jet and means for actuating said last named valve responsive to the pressure of the fuel on one side of the main fuel jet and also responsive to the pressure of a combustion modifying ingredient.

9. A fuel control body comprising, a main fuel metering jet, a fuel economizer jet, an additional fuel jet, a valve for controlling the flow of fuel through an additional jet, means for introducing a fluid comprising water and another combustion modifying ingredient into said fuel, and pressure responsive means for actuating said valve by said fuel and said fluid.

10. In an apparatus for introducing a liquid ingredient into a mixing chamber, an air conduit having a mixing chamber, means for feeding fuel to said chamber, means for feeding ingredient to said chamber, a valve having opened and closed positions for starting and stopping the flow of a predetermined portion of said fuel flow to said chamber, when the valve is in the closed position the remainder of the fuel flow continues on to said chamber, means for passing the remainder of the fuel on to said chamber, a second valve having opened and closed positions for starting and stopping the flow of ingredient to said chamber, and means for instantaneously closing said first valve when the said second valve is opened and for instantaneously opening said first valve when the second second valve is closed.

SAMUEL S. FOX.

REFERENCES CITED

The following references are of record in the file of this patent:

UNITED STATES PATENTS

| Number | Name | Date |
| --- | --- | --- |
| 1,029,740 | Beck | June 18, 1912 |
| 2,076,606 | Winter | Apr. 13, 1937 |
| 2,150,764 | Farineau | Mar. 14, 1939 |
| 2,236,032 | Helgeson | Mar. 25, 1941 |
| 2,311,827 | Hansen | Feb. 23, 1943 |
| 2,348,008 | Hunt | May 2, 1944 |
| 2,361,227 | Mock | Oct. 24, 1944 |
| 2,392,565 | Anderson et al. | Jan. 8, 1946 |
| 2,447,264 | Beardsley | Aug. 17, 1948 |

FOREIGN PATENTS

| Number | Country | Date |
| --- | --- | --- |
| 826,695 | France | Apr. 6, 1938 |
| 828,458 | France | May 18, 1938 |

Certificate of Correction

Patent No. 2,521,002 September 5, 1950

SAMUEL S. FOX

It is hereby certified that error appears in the printed specification of the above numbered patent requiring correction as follows:

Column 6, line 8, for the word "an" before "additional" read *said*; line 29, for "second second" read *said second*;

and that the said Letters Patent should be read as corrected above, so that the same may conform to the record of the case in the Patent Office.

Signed and sealed this 28th day of November, A. D. 1950.

[SEAL]

THOMAS F. MURPHY,
*Assistant Commissioner of Patents.*